(12) United States Patent
Nagado et al.

(10) Patent No.: US 12,230,076 B2
(45) Date of Patent: Feb. 18, 2025

(54) CONTROL DEVICE AND NOTIFICATION METHOD

(71) Applicant: Komatsu Ltd., Tokyo (JP)

(72) Inventors: Yoshitoshi Nagado, Tokyo (JP); Shinichi Saitou, Tokyo (JP); Toshio Kanda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/272,615

(22) PCT Filed: Mar. 4, 2022

(86) PCT No.: PCT/JP2022/009301
§ 371 (c)(1),
(2) Date: Jul. 17, 2023

(87) PCT Pub. No.: WO2022/186368
PCT Pub. Date: Sep. 9, 2022

(65) Prior Publication Data
US 2024/0144744 A1    May 2, 2024

(30) Foreign Application Priority Data
Mar. 4, 2021    (JP) .................................. 2021-034111

(51) Int. Cl.
*G07C 5/08*    (2006.01)
*F01N 3/023*    (2006.01)
(Continued)

(52) U.S. Cl.
CPC ........... *G07C 5/0808* (2013.01); *F01N 3/023* (2013.01); *F01N 3/106* (2013.01); *G07C 5/006* (2013.01)

(58) Field of Classification Search
CPC ....... G07C 5/0808; G07C 5/006; F01N 3/023; F01N 3/106; F01N 3/021; F01N 3/035;
(Continued)

(56) References Cited

U.S. PATENT DOCUMENTS

2008/0264037 A1* 10/2008 Takahashi ............. F01N 11/002
60/303
2019/0024566 A1    1/2019 Nishizawa et al.

FOREIGN PATENT DOCUMENTS

JP    2008-045428 A    2/2008
JP    2008-232073 A    10/2008
(Continued)

*Primary Examiner* — Brandon D Lee
(74) *Attorney, Agent, or Firm* — Troutman Pepper Locke LLP (57) ABSTRACT

An aspect of the present invention relates to a control device for an exhaust gas post-treatment device that includes a filter that collects a particulate substance in exhaust gas of an engine and an oxidation catalyst provided upstream of the filter, and that is configured to regenerate the filter by an action of the oxidation catalyst, the control device including a notification unit configured to, in a case in which forced regeneration for forcibly increasing a temperature of the exhaust gas is carried out, when the number of times it is estimated that the temperature of the exhaust gas is lower than a light-off temperature for a period of time equal to or longer than a prescribed period of time exceeds a prescribed threshold, issue a notification indicating that there is a problem in an operation state of the engine.

4 Claims, 10 Drawing Sheets

(51) Int. Cl.
*F01N 3/10* (2006.01)
*G07C 5/00* (2006.01)

(58) Field of Classification Search
CPC .......... F01N 3/103; F01N 9/002; F01N 11/00; F01N 2550/00; F01N 2900/0418; F01N 2900/0421; F01N 2900/1404; F02D 41/1446; F02D 41/22; F02D 41/029; F02D 41/1466; F02D 41/1495; F02D 2041/228; F02D 2200/0804; F02D 2200/101; F02D 2200/604; Y02T 10/40
See application file for complete search history.

(56) References Cited

FOREIGN PATENT DOCUMENTS

| | | | |
|---|---|---|---|
| JP | 2008-274835 | A | 11/2008 |
| JP | 2009-167871 | A | 7/2009 |
| JP | 2010-156281 | A | 7/2010 |
| JP | 2010-203297 | A | 9/2010 |
| JP | 2014-222021 | A | 11/2014 |
| JP | 2015-148182 | A | 8/2015 |
| WO | 2017/131086 | A1 | 8/2017 |

\* cited by examiner

| DETERMINATION CONDITION | DETERMINATION RESULT | | |
|---|---|---|---|
| | INEFFICIENT REGENERATION (1) | INEFFICIENT REGENERATION (2) | INCOMPLETE REGENERATION |
| | PERIOD OF TIME DURING WHICH DOC OUTLET TEMPERATURE IS EQUAL TO OR LOWER THAN Target TEMPERATURE - 50° C DURING HC DOSING IS EQUAL TO OR LONGER THAN 1 HOUR | THE NUMBER OF TIMES REGENERATION IS STARTED OVER FROM WarmUp IS EQUAL TO OR HIGHER THAN X TIMES | PERIOD OF TIME SINCE REGENERATION IS REQUESTED IS EQUAL TO OR LONGER THAN 2 HOURS |
| STATE OF ENGINE | THERE IS NO PROBLEM | THERE IS NO PROBLEM | THERE IS POSSIBILITY THAT ENGINE FAILS OR IS LEFT IN LOW IDLE STATE |
| STATE OF DPF | THERE IS POSSIBILITY THAT DOC IS DETERIORATED | THERE IS NO PROBLEM | THERE IS NO PROBLEM |
| OPERATION CONDITION OF VEHICLE | THERE IS NO PROBLEM | LOAD FLUCTUATION IS LARGE AND DOC INLET TEMPERATURE IS FREQUENTLY LOWER THAN 250° C | THERE IS NO PROBLEM |
| COUNTERMEASURE | TO REQUEST STATIONARY MANUAL REGENERATION. TO CARRY OUT TROUBLESHOOTING (MEASUREMENT OF DOC EFFICIENCY, DOC DRYING OPERATION, OR LIKE) RELATED TO DPF IN CASE IN WHICH PROBLEM IS NOT SOLVED | TO RECOMMEND STATIONARY MANUAL REGENERATION (WARNING) | TO REQUEST STATIONARY MANUAL REGENERATION. TO CARRY OUT TROUBLESHOOTING (VGT DEFECT, AIR LEAKAGE, OR LIKE) OF ENGINE IN CASE IN WHICH PROBLEM IS NOT SOLVED |

CONTROL DEVICE AND NOTIFICATION METHOD

TECHNICAL FIELD

The present invention relates to a control device and a notification method.

Priority is claimed on Japanese Patent Application No. 2021-034111, filed Mar. 4, 2021, the content of which is incorporated herein by reference.

BACKGROUND ART

As described in Patent Literature 1, in an exhaust gas purification device of a diesel engine, when a temperature of exhaust gas is held to be equal to or higher than a light-off temperature (activation temperature) of a catalyst of a filter for a prescribed period of time (for example, for several minutes), the collected particulate substance is burned and the filter is regenerated (self-regenerated). However, when the temperature of the exhaust gas does not reach the activation temperature or the temperature is decreased in a state in which the regeneration is not completed even when the temperature of the exhaust gas reaches the activation temperature, the particulate substance is accumulated in the filter. As a regeneration method of the filter for avoiding such a situation, there is forced regeneration in which the particulate substance is removed by forcibly increasing the temperature of the exhaust gas. The forced regeneration includes automatic regeneration in which the regeneration is automatically carried out when a certain condition is satisfied and manual regeneration in which the regeneration is carried out at any timing by an operation of an operator. However, in a work machine, even in a case in which the forced regeneration is automatically or manually carried out, the engine is frequently stopped and the fluctuation of the number of revolutions of the engine is large depending on a work content or a work load. Therefore, there is a strong tendency for the particulate substance to deposit in spite of the fact that the forced regeneration is carried out.

Accordingly, the work machine described in Patent Literature 1 is the work machine including the exhaust gas purification device that collects the particulate substance in the exhaust gas of the diesel engine by using the filter, and burns the collected particulate substance to regenerate the filter, the work machine including regeneration determination means for determining that the forced regeneration fails when the temperature of the exhaust gas reaches a value lower than a threshold indicating the regeneration is possible, for example, during the forced regeneration of the filter, and notification means for issuing a notification indicating that the forced regeneration fails when the number of times it is determined by the regeneration determination means that the forced regeneration fails reaches a value equal to or higher than a prescribed threshold. In the work machine described in Patent Literature 1, for example, in a case in which the automatic regeneration of the filter fails a prescribed number of times, notifications of a warning message indicating that the forced regeneration fails, the number of times of regeneration failure, and a reason why the regeneration fails, such as the decrease in the temperature of the exhaust gas, are issued. Further, with the work machine described in Patent Literature 1, even in a case in which the regeneration failure occurs frequently due to a usage form of the work machine or the like, it is possible to prevent frequent display of the fact that regeneration fails.

CITATION LIST

Patent Literature

[Patent Literature 1]
  Japanese Unexamined Patent Application, First Publication No. 2010-203297

SUMMARY OF INVENTION

Technical Problem

In the work machine described in Patent Literature 1, it is possible to issue the notification of the reason why the regeneration fails, such as the decrease in the temperature of the exhaust gas, after the regeneration fails, but there is a problem that it is not possible to issue a notification indicating that there is a problem in an operation state or the like during the forced regeneration in a case in which the regeneration does not fail, in a case in which the regeneration fails due to other reasons, or the like.

The present invention has been made in view of the above circumstances, and is to provide a control device and a notification method capable of issuing the notification indicating that there is the problem in the operation state or the like during the forced regeneration.

Solution to Problem

In order to solve the above problems, an aspect of the present invention relates to a control device for an exhaust gas post-treatment device that includes a filter that collects a particulate substance in exhaust gas of an engine and an oxidation catalyst provided upstream of the filter, and that is configured to regenerate the filter by an action of the oxidation catalyst, the control device including a regeneration state determination unit configured to, in a case in which forced regeneration for forcibly increasing a temperature of the exhaust gas is carried out, when the number of times it is estimated that the temperature of the exhaust gas is lower than a light-off temperature for a period of time equal to or longer than a prescribed period of time exceeds a prescribed threshold, issue a notification indicating that there is a problem in an operation state of the engine.

In addition, another aspect of the present invention relates to a notification method for an exhaust gas post-treatment device that includes a filter that collects a particulate substance in exhaust gas of an engine and an oxidation catalyst provided upstream of the filter, and that is configured to regenerate the filter by an action of the oxidation catalyst, the notification method including a step of, in a case in which forced regeneration for forcibly increasing a temperature of the exhaust gas is carried out, when the number of times it is estimated that the temperature of the exhaust gas is lower than a light-off temperature for a period of time equal to or longer than a prescribed period of time exceeds a prescribed threshold, issuing a notification of that fact.

Advantageous Effects of Invention

According to each of the aspects of the present invention, it is possible to issue the notification indicating that there is the problem in the operation state or the like during the forced regeneration.

DESCRIPTION OF EMBODIMENTS

An embodiment of the present invention will be described below with reference to drawings. It should be noted that, in each drawing, the same reference numerals are used for the same or corresponding configurations, and the description thereof will be omitted as appropriate.

Engine Control System 10

Figure 1:
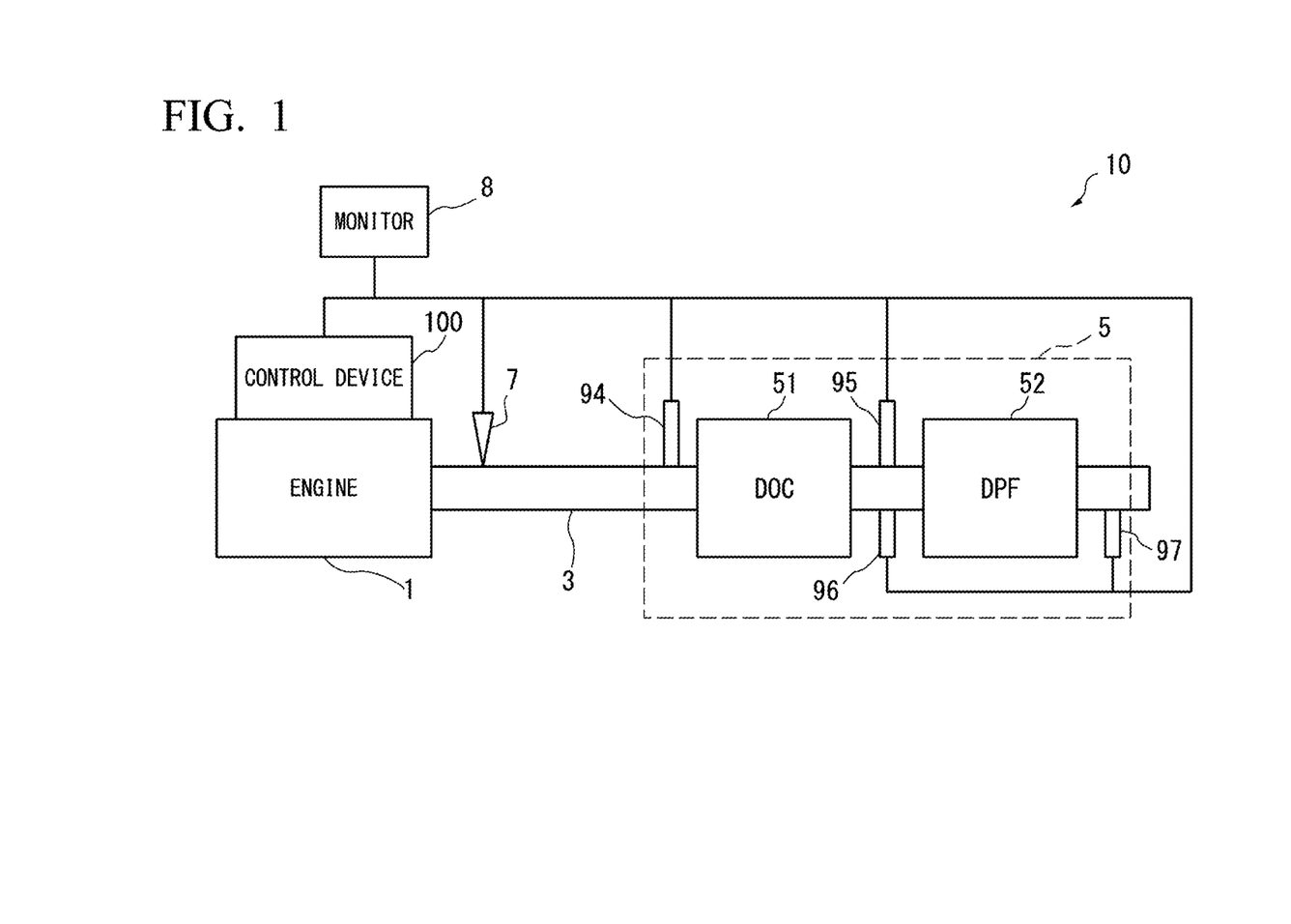
FIG. 1 is a system diagram showing a configuration example of an engine control system according to an embodiment of the present invention.

FIG. 1 is a system diagram showing a configuration example of an engine control system 10 as a configuration example of an exhaust gas purification system according to each embodiment of the present invention. The engine control system 10 shown in FIG. 1 includes an engine 1, an exhaust pipe 3, a DPF device 5 as a configuration example of an exhaust gas post-treatment device, a monitor 8, a control device 100, and an HC doser 7. It should be noted that FIG. 1 and the like mainly show a configuration related to forced regeneration of the DPF device 5 in the engine control system 10 (or the control device 100) according to the present embodiment, and the configurations related to other functions, such as fuel injection control, are not shown as appropriate.

The engine 1 is a configuration example of an internal combustion engine, and is a multi-cylinder diesel engine in the present embodiment. The exhaust pipe 3 exhausts exhaust gas of the engine 1 to the atmosphere through the DPF device 5.

The DPF device 5 is a device that purifies a particulate substance (particulate matter (PM)) contained in the exhaust gas of the engine 1, and includes a diesel oxidation catalyst (DOC) 51 provided in the exhaust pipe 3 of the engine 1 and a diesel particulate filter (DPF) 52 which is a filter that collects the PM in the exhaust gas of the engine 1. The DPF device 5 regenerates the DPF 52 by an action of the DOC 51. The DPF device 5 generates carbon dioxide by oxidizing the PM collected downstream by nitrogen dioxide converted by DOC 51 provided upstream of the DPF 52, and removes the PM.

In addition, the DPF device 5 includes a DOC inlet temperature sensor 94 that detects a temperature of the exhaust gas at an inlet of the DOC 51, a DOC outlet temperature sensor 95 that detects the temperature of the exhaust gas at an outlet of the DOC 51, and a pair of pressure sensors 96 and 97 that detect a differential pressure between an inlet and an outlet of the DPF 52. The detected values of the DOC inlet temperature sensor 94, the DOC outlet temperature sensor 95, and the pressure sensors 96 and 97 are output to the control device 100.

The HC doser 7 is an exhaust pipe fuel injection device that injects the fuel (HC) into the exhaust pipe 3 upstream of the DOC 51 (hereinafter, referred to as HC dosing or the like). The HC dosing using the HC doser 7 is controlled by the control device 100.

The monitor 8 includes, for example, a display panel and an input panel, functions as a display device and an input device, and displays a prescribed character or image in response to an instruction of the control device 100 or outputs a signal in response to an input operation of a user (operator) to the control device 100.

In the engine control system 10 according to the present embodiment, forced regeneration (DPF regeneration operation) is periodically carried out to burn the PM deposited in the DPF 52. In this forced regeneration, the temperature of the exhaust gas or the temperature of the DOC 51 is forcibly increased. The forced regeneration is carried out, for example, by burning the HC in the DOC 51 disposed upstream of the DPF 52 and increasing the temperature of the DPF 52 by post-injection for mixing the fuel with the exhaust gas in the engine 1 or a combination of the post-injection and HC (fuel) dosing (injection) using the HC doser 7 into the exhaust pipe 3 disposed upstream of the DPF device 5.

It should be noted that, in the engine control system 10 according to the present embodiment, the forced regeneration (DPF regeneration operation) includes automatic regeneration in which the regeneration is automatically carried out in a normal running state (state in which normal operation or work can be carried out without forcibly fixing the number of revolutions of the engine or the like) when a certain condition is satisfied, and stationary manual regeneration (manual regeneration) in which the regeneration is carried out at any timing by the operation of the user. The stationary manual regeneration is control of stopping the normal running under the permission of the user and recovering the performance of the DPF device 5 in a case in which the temperature of the exhaust gas is not sufficiently increased in the normal running state and the temperature of the DPF device 5 cannot be stably controlled to a target temperature. In the stationary manual regeneration, the control device 100 first issues a state in which the stationary manual regeneration can be carried out and a request to carry out the stationary manual regeneration, to the user by using the monitor 8. On the other hand, when the user issues an instruction to carry out the stationary manual regeneration by using the monitor 8, the control device 100 fixes the number of revolutions of the engine at a certain revolution, increases the temperature of the exhaust gas, and carries out the forced regeneration.

Control Device 100

Figure 2:
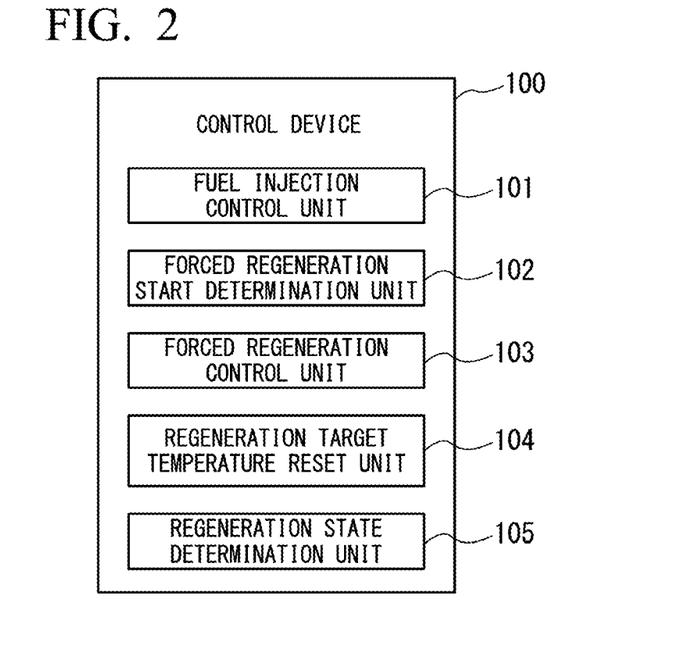
FIG. 2 is a block diagram showing a configuration example of a control device 100 shown in FIG. 1.
Figure 3:
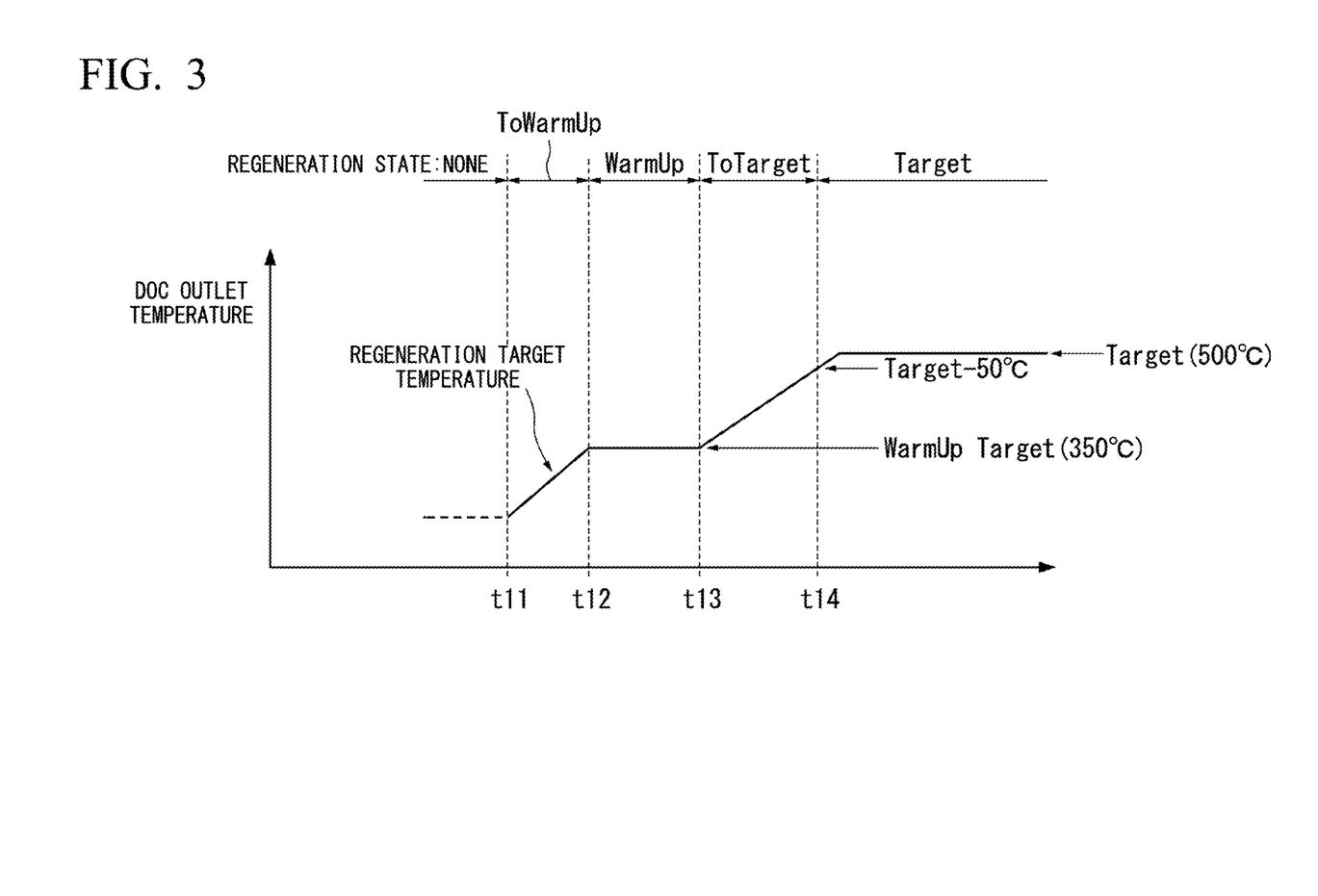
FIG. 3 is a timing chart schematically showing an operation example of the control device 100 shown in FIG. 2.
Figure 4:
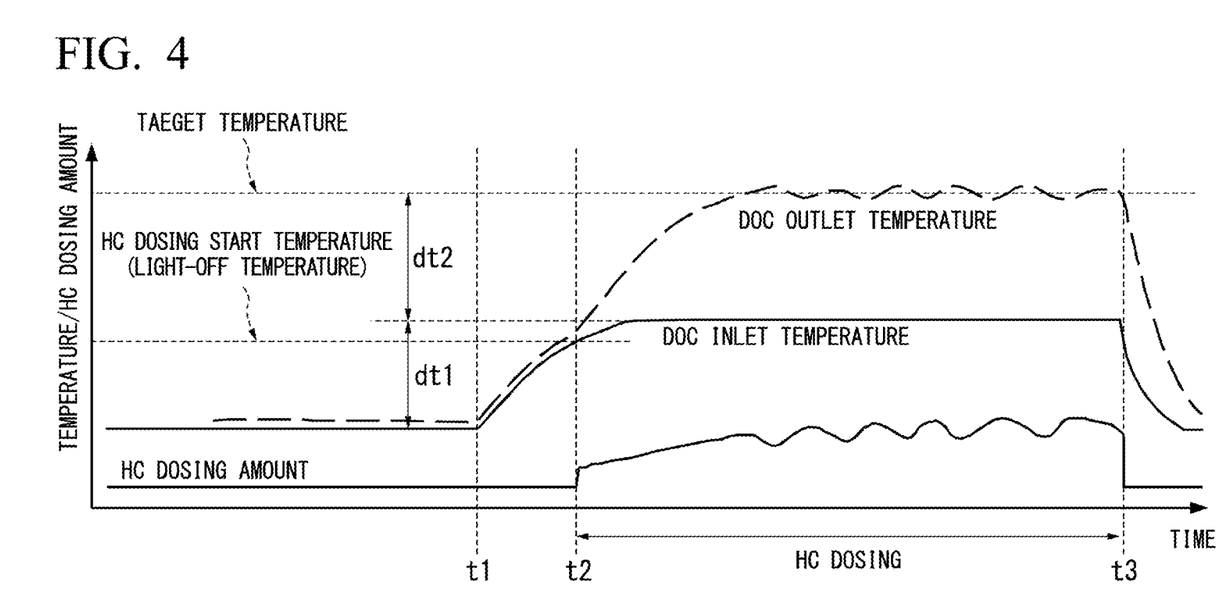
FIG. 4 is a timing chart schematically showing an operation example of the engine control system shown in FIG. 1.
Figure 5:
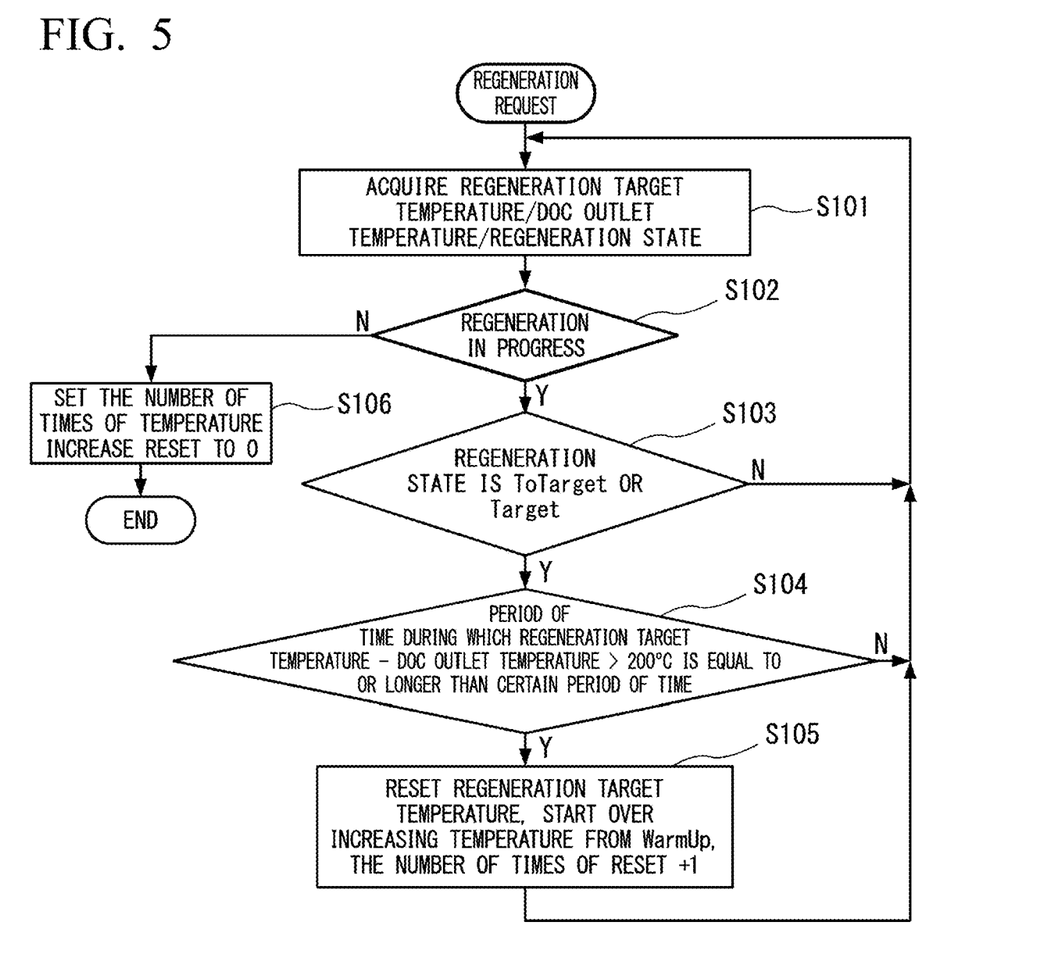
FIG. 5 is a flowchart showing an operation example of a regeneration target temperature reset unit 104 shown in FIG. 2.
Figure 6:
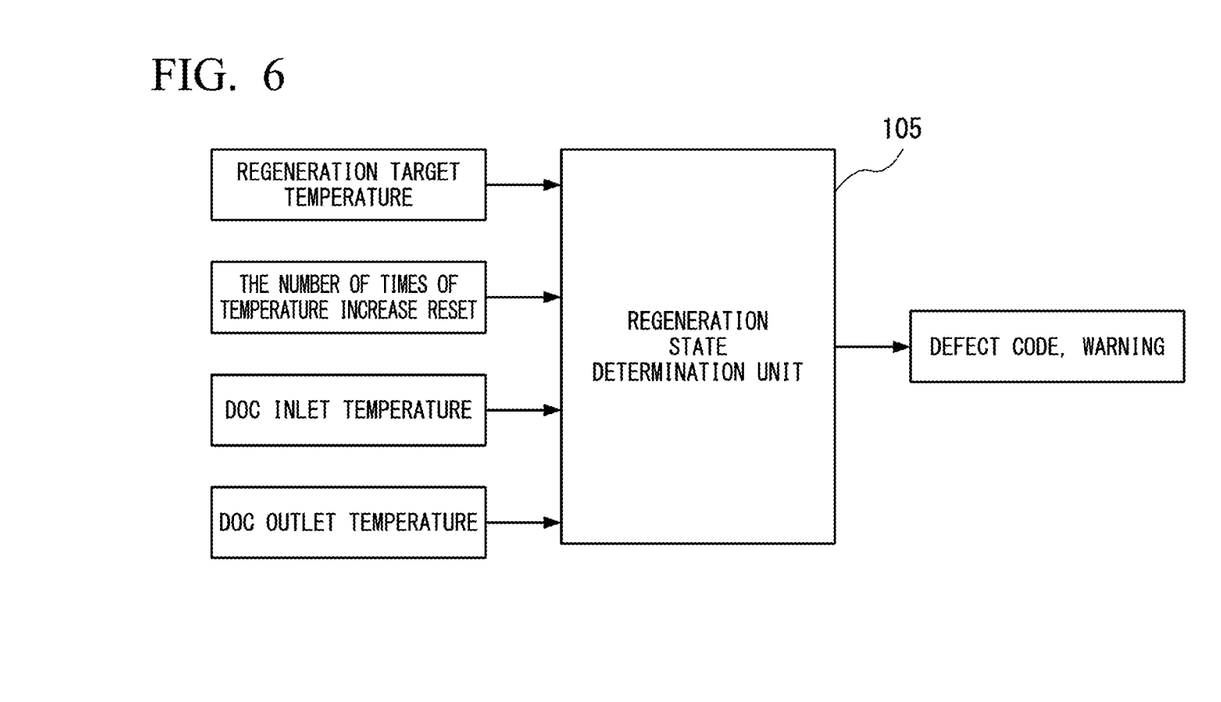
FIG. 6 is a control block diagram showing a regeneration state determination unit 105 shown in FIG. 2.
Figure 7:
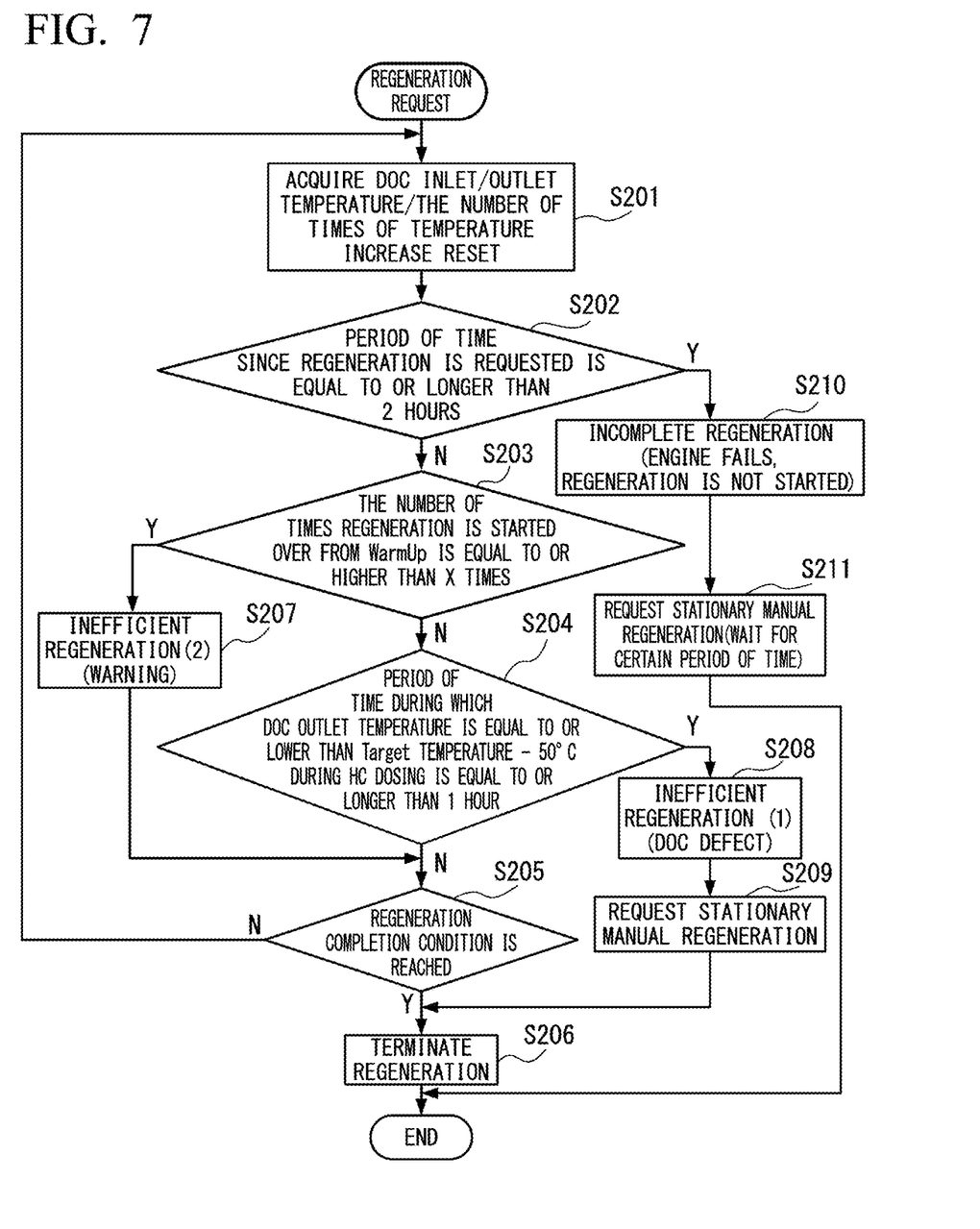
FIG. 7 is a flowchart showing an operation example of the regeneration state determination unit 105 shown in FIG. 2.
Figure 8:
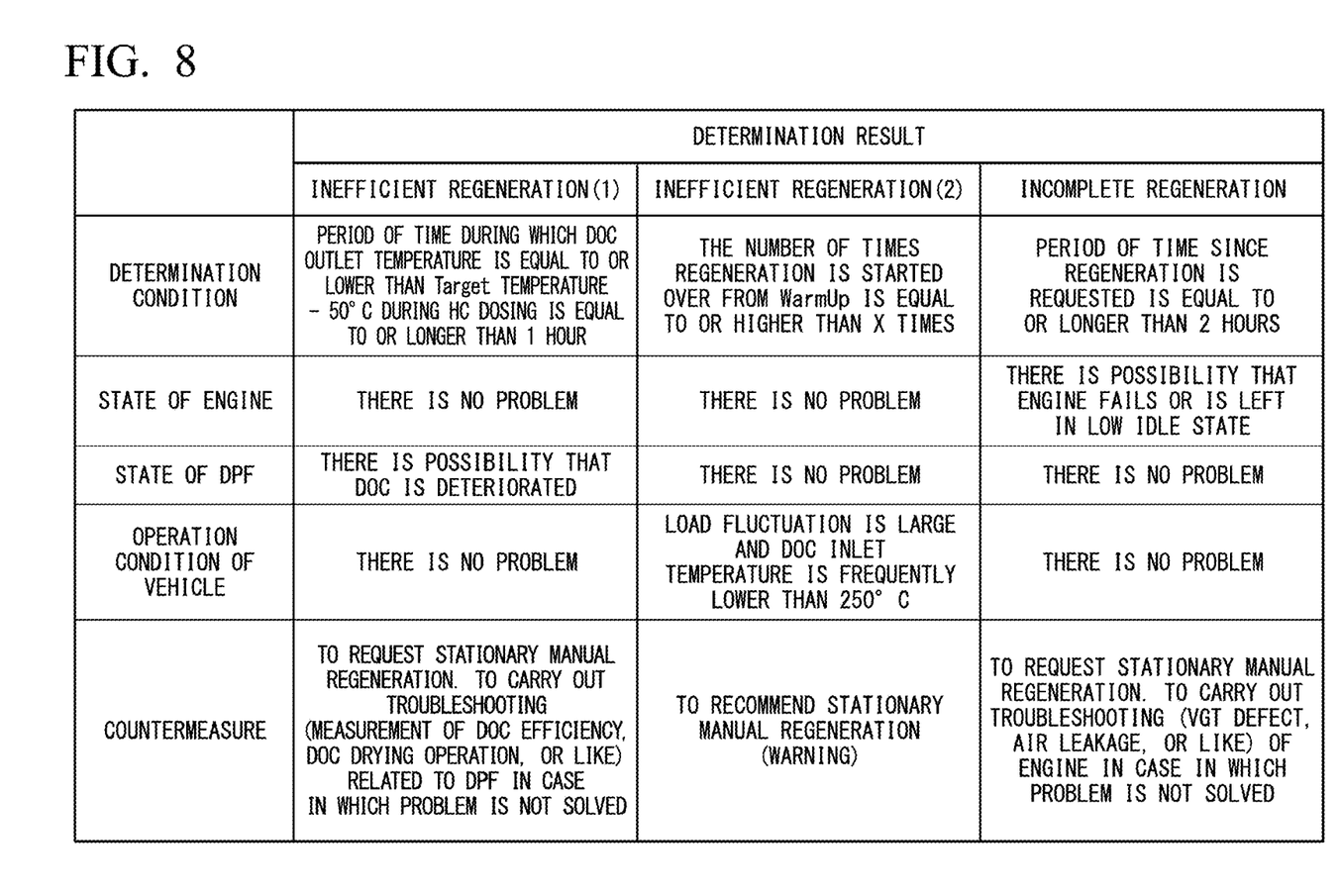
FIG. 8 is a schematic diagram for describing the operation example of the regeneration state determination unit 105 shown in FIG. 2.
Figure 9:
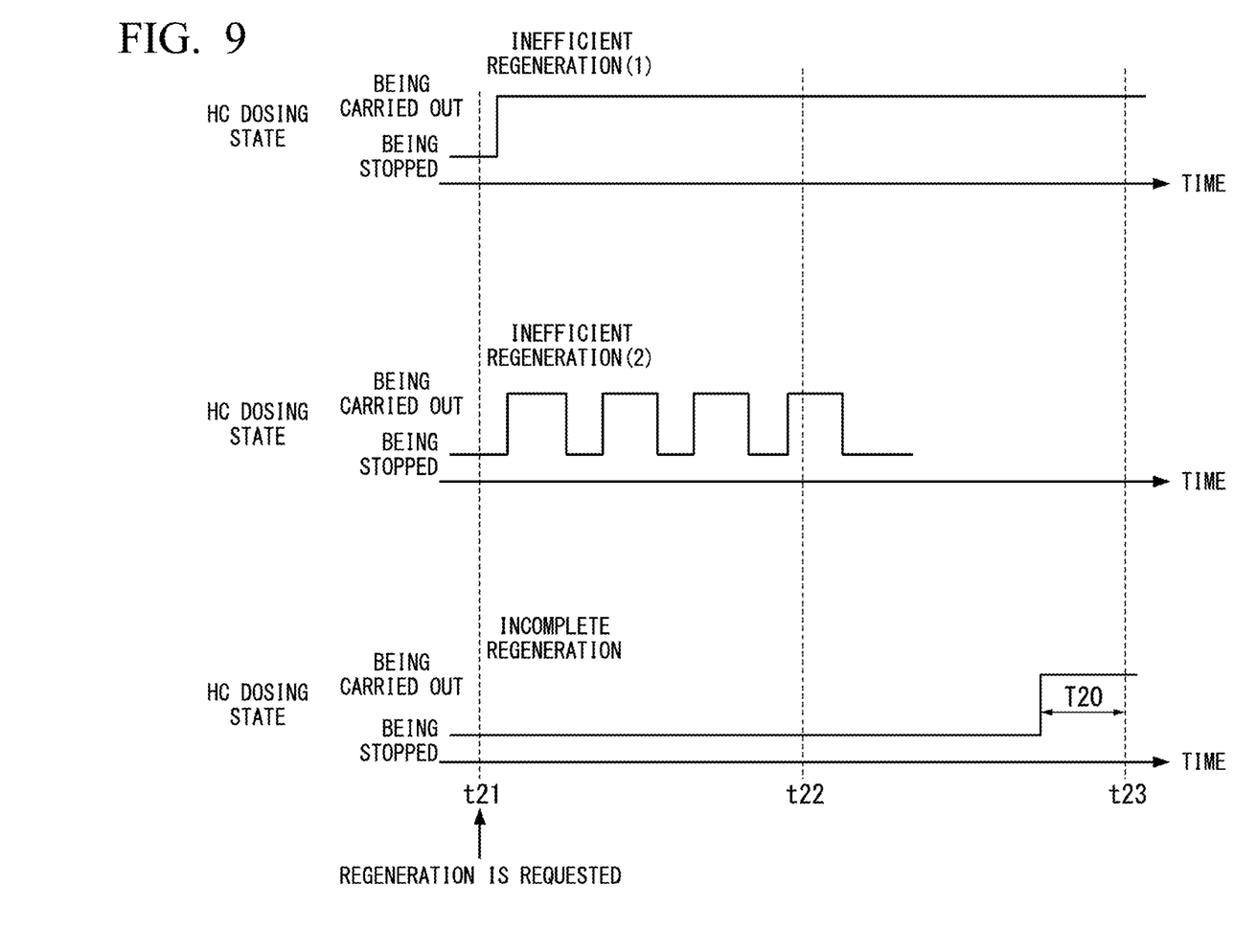
FIG. 9 is a schematic diagram for describing the operation example of the regeneration state determination unit 105 shown in FIG. 2.
Figure 10:
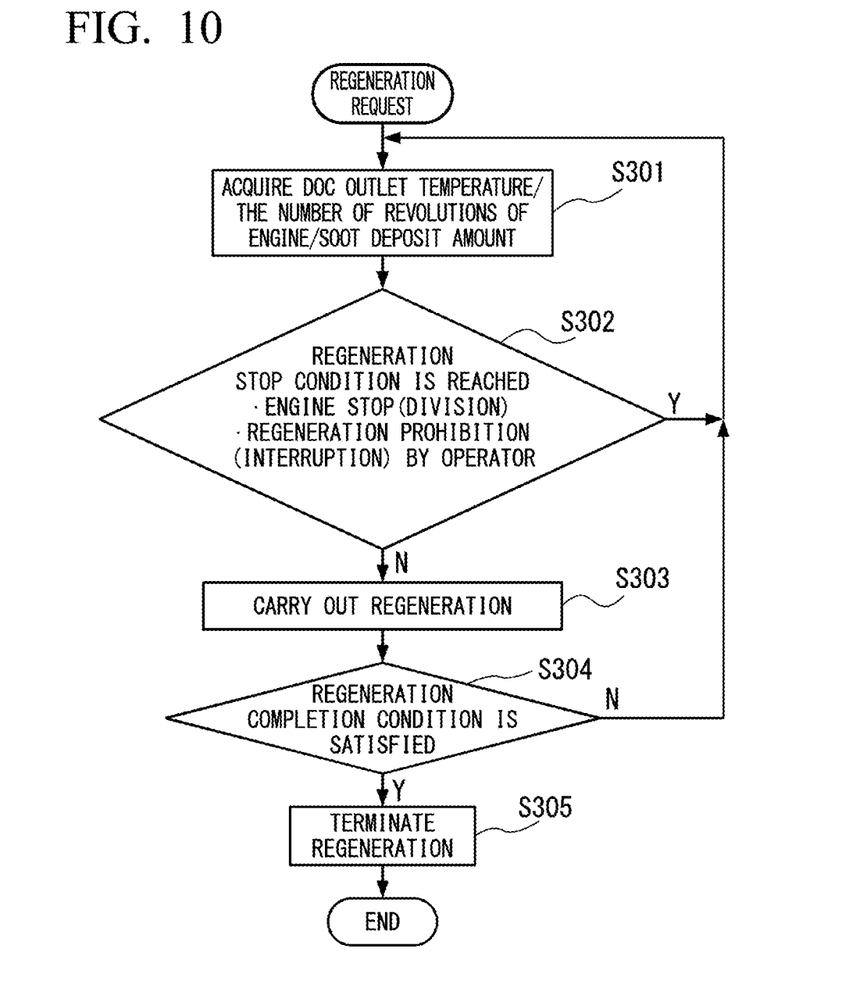
FIG. 10 is a flowchart showing the operation example of the regeneration state determination unit 105 shown in FIG. 2.

A configuration example and an operation example of the control device 100 shown in FIG. 1 will be described with reference to FIGS. 2 to 10. FIG. 2 is a block diagram showing the configuration example of the control device 100 shown in FIG. 1. FIG. 3 is a timing chart schematically showing the operation example of the control device 100 shown in FIG. 2. FIG. 4 is a timing chart schematically showing an operation example of the engine control system 10 shown in FIG. 1. FIG. 5 is a flowchart showing an operation example of a regeneration target temperature reset unit 104 shown in FIG. 2. FIG. 6 is a control block diagram showing a regeneration state determination unit 105 shown in FIG. 2. FIG. 7 is a flowchart showing an operation example of the regeneration state determination unit 105 shown in FIG. 2. FIGS. 8 and 9 are schematic diagrams for describing the operation example of the regeneration state determination unit 105 shown in FIG. 2. FIG. 10 is a flowchart showing the operation example of the regeneration state determination unit 105 shown in FIG. 2.

The control device 100 shown in FIG. 2 can be configured by using, for example, a computer, such as a microcomputer, and peripheral circuits or peripheral devices of the computer, and includes a plurality of blocks shown in FIG. 2 as functional configurations configured by using a combination of the hardware, such as the computer, and the software, such as a program executed by the computer. In the example shown in FIG. 2, the control device 100 includes a fuel injection control unit 101, a forced regeneration start determination unit 102, a forced regeneration control unit 103, the regeneration target temperature reset unit 104, and the regeneration state determination unit 105. It should be noted that the control device 100 has a function of acquiring the number of revolutions (revolution speed) of the engine 1 based on the output of a revolution speed sensor (not shown), or estimating a soot deposition amount in the DPF device 5 based on the operation state or the like.

For example, the fuel injection control unit 101 controls a fuel injection device (not shown) of the engine 1, for example, in response to an instruction of the forced regeneration control unit 103 to carry out the post-injection during the forced regeneration.

Based on the differential pressure of the DPF 52 detected by the pressure sensors 96 and 97, the forced regeneration start determination unit 102 requests the start of the forced regeneration in a case in which the differential pressure exceeds a prescribed threshold. In the present embodiment, a state in which the start of the forced regeneration is requested by the forced regeneration start determination unit 102 is defined as a state in which there is a regeneration request. The state in which there is the regeneration request is set to a state in which there is no regeneration request, for example, in a case in which the regeneration state determination unit 105 determines that the regeneration is completed, or determines that the regeneration is terminated in a state in which the regeneration cannot be completed.

In a case in which there is the regeneration request, the forced regeneration control unit 103 carries out temperature control during the forced regeneration as follows. That is, the forced regeneration control unit 103 carries out the temperature control by carrying out feedback on the DOC outlet temperature by, for example, control of the post-injection of the engine 1 and control of an HC dosing amount using the HC doser 7 such that the DOC outlet temperature matches a prescribed regeneration target temperature sequentially calculated as shown in FIG. 3, for example. It should be noted that the HC is dosed (injected) only after the DOC inlet temperature reaches a temperature (light-off temperature, for example, about 250° C.) at which the catalyst contained in the DOC 51 is activated.

FIG. 3 schematically shows a change in the regeneration target temperature with a horizontal axis representing time and a vertical axis representing the DOC outlet temperature. In the example shown in FIG. 3, the forced regeneration control unit 103 changes the regeneration target temperature into the regeneration state of the following five stages. It should be noted that, in the example shown in FIG. 3, it is assumed that there is the regeneration request at a point in time t11 (there is no regeneration state until the point in time t11). The regeneration state has five stages of (1) before the regeneration is started (regeneration state: none), (2) a ToWarmUp state until the temperature reaches a WarmUp Target temperature (about 350° C.), (3) a WarmUp state in which the temperature reaches the WarmUp Target temperature, (4) a ToTarget state until the temperature reaches a Target temperature (about 500° C., final target temperature), and (5) a Target state in which the temperature reaches the Target temperature.

The ToWarmUp state is the regeneration state in which the maximum value of the regeneration target temperature is set to the WarmUp Taeget temperature (for example, 350° C.). In the ToWarmUp state, the regeneration target temperature is calculated such that the temperature is increased to the WarmUp Taeget temperature by a point in time t12 after a prescribed period of time by using the actual DOC outlet temperature at the point in time t11 when the forced regeneration is started as an initial value. The regeneration state from the point in time t11 to the point in time t12 is the ToWarmUp state.

In addition, the WarmUp state is the regeneration state in which the regeneration target temperature is fixed at the WarmUp Taeget temperature (for example, 350° C.). The regeneration state from the point in time t12 to a point in time t13 after a prescribed period of time is the WarmUp state. It should be noted that, in the following description, in some cases, the ToWarmUp state and the WarmUp state are collectively referred to as the WarmUp state. In addition, the period of time from the point in time t11 to the point in time t13 is, for example, about 2 minutes with one temperature increase.

In addition, the ToTarget state is the regeneration state in which the maximum value of the regeneration target temperature is set to the Taeget temperature–50° C. (for example, 450° C.). In the ToTarget state, the regeneration target temperature is calculated such that the temperature is increased to the Taeget temperature–50° C. by a point in time t14 after a prescribed period of time by using the WarmUp Taeget temperature (for example, 350° C.) as an initial value. The regeneration state from the point in time t13 to the point in time t14 is the ToTarget state.

In addition, the Target state is the regeneration state in which the maximum value of the regeneration target temperature is set to the Taeget temperature (for example, 500° C.). In the Target state, the regeneration target temperature is calculated such that the temperature is increased to the Taeget temperature (for example, 500° C.) with a prescribed inclination by using the Taeget temperature–50° C. (for example, 450° C.) as an initial value, and the temperature is fixed to the Taeget temperature after increasing to the Taeget temperature. The regeneration state after the point in time t14 is the Target state.

FIG. 4 schematically shows an example of the temperature control with the horizontal axis representing time and the vertical axis representing the DOC inlet temperature, the DOC outlet temperature, or the HC dosing amount. In the example shown in FIG. 4, it is assumed that there is the regeneration request at a point in time t1. The forced regeneration is started at the point in time t1 and, for example, the DOC inlet temperature and the DOC outlet temperature are increased by the control of the post-injection. Then, when the DOC inlet temperature reaches an HC dosing start temperature (for example, the light-off temperature or a temperature with a prescribed margin for the light-off temperature) at a point in time t2, the HC dosing is started. Thereafter, the DOC outlet temperature is subjected to the feedback control to reach the final value (Target temperature) of the regeneration target temperature in the Target state. Then, when the regeneration is completed at a point in time t3, the forced regeneration is terminated, and the HC dosing is stopped. It should be noted that dt1 corresponds to an increase in the temperature of the exhaust gas in the engine, and dt2 corresponds to an increase in the temperature due to the burning in the DOC 51 by supplying the fuel.

Hereinafter, the regeneration target temperature reset unit 104 shown in FIG. 2 will be described. The regeneration target temperature reset unit 104 has a function of resetting the regeneration target temperature to the regeneration target temperature in the ToWarmUp state or the WarmUp state under a certain condition. In a case in which the forced regeneration is started and the regeneration state is the ToTarget state or the Target state, when the regeneration target temperature−DOC outlet temperature is equal to or higher than 200° C., for example, the regeneration target temperature reset unit 104 resets the regeneration state by the forced regeneration control unit 103 to the ToWarmUp state or the WarmUp state such that the DOC outlet temperature is prevented from being excessive due to excessive feedback. It should be noted that, in the following description, the operation example will be described with a case in which the condition is "the regeneration target temperature−the DOC outlet temperature is equal to or higher than 200° C.", as an example.

FIG. 5 shows the operation example of the regeneration target temperature reset unit 104. The process shown in FIG. 5 is carried out in a case in which there is the regeneration request. When the process shown in FIG. 5 is started, the regeneration target temperature reset unit 104 first acquires the regeneration target temperature, the DOC outlet temperature, and the regeneration state (step S101). Then, the regeneration target temperature reset unit 104 determines whether or not the forced regeneration is in progress (step S102). In a case in which the forced regeneration is in progress (in a case of "Y" in step S102), the regeneration target temperature reset unit 104 determines whether or not the regeneration state is the ToTarget state or the Target state (step S103). In a case in which the regeneration state is the ToTarget state or the Target state (in a case of "Y" in step S103), the regeneration target temperature reset unit 104 determines whether or not a period of time during which the regeneration target temperature−the DOC outlet temperature>200° C. is equal to or longer than a certain period of time (step S104).

A case in which the period of time during which the regeneration target temperature−the DOC outlet temperature>200° C. is equal to or longer than the certain period of time, which is a determination condition in step S104, can be set to correspond to a case in which it is estimated that the temperature of the exhaust gas (inlet temperature of the DOC 51) is lower than the light-off temperature for a period of time equal to or longer than a prescribed period of time. Regarding a temperature condition, since the maximum value of the regeneration target temperature is the final target value (target temperature=for example, 500° C.) in the Target state, in this example, the DOC outlet temperature<300° C. In addition, by appropriately setting a certain period of time, a time condition can correspond to a case in which it is estimated that the temperature of the exhaust gas (inlet temperature of the DOC 51) is lower than the light-off temperature for the period of time equal to or longer than the prescribed period of time. The certain period of time is, for example, about several tens of seconds to several minutes.

In a case in which the period of time during which the regeneration target temperature−the DOC outlet temperature>200° C. is equal to or longer than the certain period of time (in a case of "Y" in step S104), the regeneration target temperature reset unit 104 resets the regeneration target temperature, issues an instruction to the forced regeneration control unit 103 to start over the regeneration state from the WarmUp state (ToWarmUp state or WarmUp state), and increases the number of times of temperature increase reset by 1 (step S105). The number of times of temperature increase reset represents the number of times the regeneration state is reset from the ToTarget state or the Target state to the ToWarmUp state or the WarmUp state (the number of times increasing the DOC outlet temperature is started over from a temperature at which it is estimated that the DOC inlet temperature is lower than the light-off temperature to a temperature at which it is estimated that the DOC inlet temperature exceeds the light-off temperature) during a period from the issuing of the regeneration request to the termination of the forced regeneration.

On the other hand, in a case in which the regeneration state is not the ToTarget state and is not the Target state (in a case of "N" in step S103), or in a case in which the period of time during which the regeneration target temperature−the DOC outlet temperature>200° C. is not equal to or longer than the certain period of time (in a case of "N" in step S104), the regeneration target temperature reset unit 104 carries out the processes in and after step S101 again.

On the other hand, in a case in which the forced regeneration is not in progress (in a case in which the forced regeneration is terminated) (in a case of "N" in step S103), the regeneration target temperature reset unit 104 initializes the number of times of temperature increase reset to 0 (step S106), and terminates the process shown in FIG. 5.

Hereinafter, the regeneration state determination unit 105 shown in FIG. 2 will be described. In a case in which the DOC outlet temperature cannot reach the Taeget temperature during the forced regeneration, the regeneration state determination unit 105 determines what kind of state the temperature control is, and notifies the user of the determination result, the cause, the countermeasure method, or the like. In the present embodiment, a case in which the DOC outlet temperature cannot reach the Taeget temperature during the forced regeneration is classified into three cases of inefficient regeneration (1), inefficient regeneration (2), and incomplete regeneration.

Inefficient regeneration (1): A case in which the temperature of the exhaust gas (DOC inlet temperature) reaches the light-off temperature, but the HC is not burned in the DOC 51 and the DOC outlet temperature does not reach the Target temperature (for example, 500° C.) because the catalyst of the DOC 51 is deteriorated.

Inefficient regeneration (2): A case in which the HC injection is frequently stopped and the DOC outlet temperature does not reach the Target temperature because the DOC inlet temperature is frequently increased and decreased across the light-off temperature due to the operation state and the like.

Incomplete regeneration: A case in which the HC injection cannot be carried out and the DOC outlet temperature does not reach the Target temperature because the temperature of the exhaust gas does not reach the light-off temperature (250° C.) due to the defect of the engine.

In order to carry out the case classification described above, the regeneration state determination unit 105 determines the state of the defect or the like in more detail by carrying out the calculation including the DOC inlet temperature, the DOC outlet temperature, the regeneration state, and the number of times of regeneration target temperature reset, as shown in FIG. 6. In addition, the regeneration state determination unit 105 notifies a prescribed notification destination, for example, a defect code as information indicating the determination result, or notifies the user of information indicating a warning. Here, the prescribed notification destination is, for example, an external server that remotely manages the running state or the like of the engine control system 10, an external notification destination registered in advance on a WEB system, or the like. Also, the regeneration state determination unit 105 may notify the user of certain information based on the determination result by using the monitor 8.

The operation example of the regeneration state determination unit 105 will be described with reference to FIG. 7. The process shown in FIG. 7 is carried out in a case in which there is the regeneration request. When the process shown in FIG. 7 is started, the regeneration state determination unit 105 first acquires the DOC inlet temperature, the DOC outlet temperature, and the number of times of temperature increase reset (step S201). Then, the regeneration state determination unit 105 determines whether or not a period of time since the regeneration is requested is equal to or longer than 2 hours (step S202). The term "2 hours" in this case is an example of a period of second determination time that is longer than the period of first determination time.

In a case in which the period of time since the regeneration is requested is equal to or longer than 2 hours (in a case of "Y" in step S202), the regeneration state determination unit 105 determines that this case is a case of the incomplete regeneration, issues a notification indicating that the regeneration is not started due to the defect of the engine (step S210), and requests the stationary manual regeneration subsequently (step S211). In step S211, for example, a response to the request for the stationary manual regeneration is waited for a certain period of time, a warning is further issued, for example, in a case in which there is no response and there is no increase in the DOC outlet temperature, and then the process shown in FIG. 7 is terminated.

On the other hand, in a case in which the period of time since the regeneration is requested is not equal to or longer than 2 hours (in a case of "N" in step S202), the regeneration state determination unit 105 determines whether or not the number of times the regeneration is started over from the WarmUp state is equal to or higher than X times (X is any natural number) based on the number of times of temperature increase reset (step S203). In a case in which the number of times the regeneration is started over from the WarmUp is equal to or higher than X times (in a case of "Y" in step S203), the regeneration state determination unit 105 determines that this case is a case of the inefficient regeneration (2) to issue a notification of the warning or the like (step S207), and determines whether or not a regeneration completion condition is reached (step S205). The regeneration completion condition is, for example, a case in which a PM deposition amount estimated from a change in the temperature of the regeneration control by using an estimated value of the PM deposition amount estimated from the pressure difference as an initial value is equal to or lower than a prescribed threshold, a case in which a period of time during which the DOC outlet temperature reaches the Target temperature−50° C. is equal to or longer than a prescribed threshold, and the like. In a case in which the regeneration completion condition is reached (in a case of "Y" in step S205), the regeneration state determination unit 105 terminates the forced regeneration (sets the presence of the regeneration request to the absence) (step S206), and terminates the process shown in FIG. 7. On the other hand, in a case in which the regeneration completion condition is not reached (in a case of "N" in step S205), the regeneration state determination unit 105 carries out the processes in and after step S201 again.

On the other hand, in a case in which the number of times the regeneration is started over from the WarmUp is not equal to or higher than X times (in a case of "N" in step S203), the regeneration state determination unit 105 determines whether or not the period of time during which the DOC outlet temperature is equal to or lower than the Target temperature−50° C. during the HC dosing is equal to or longer than 1 hour (step S204). Here, the term "during HC dosing" means that a state in which the DOC inlet temperature reaches the HC dosing start temperature (for example, the light-off temperature or the temperature with a prescribed margin for the light-off temperature) is continued. In addition, the term "1 hour" in this case is an example of a period of first determination time.

In a case in which the period of time during which the DOC outlet temperature is equal to or lower than the Target temperature−50° C. during the HC dosing is equal to or longer than 1 hour (in a case of "Y" in step S204), the regeneration state determination unit 105 determines that this case is a case of the inefficient regeneration (1) to issue a notification indicating that there is a possibility of the defect of the DOC 51 (step S208), requests the stationary manual regeneration subsequently (step S209), terminates the forced regeneration (sets the presence of the regeneration request to the absence) (step S206), and terminates the process shown in FIG. 7.

On the other hand, in a case in which the period of time during which the DOC outlet temperature is equal to or lower than the Target temperature−50° C. during the HC dosing is not equal to or longer than 1 hour (in a case of "N" in step S204), the regeneration state determination unit 105 determines whether or not the regeneration completion condition is reached (step S205). In a case in which the regeneration completion condition is reached (in a case of "Y" in step S205), the regeneration state determination unit 105 terminates the forced regeneration (sets the presence of the regeneration request to the absence) (step S206), and terminates the process shown in FIG. 7. On the other hand, in a case in which the regeneration completion condition is not reached (in a case of "N" in step S205), the regeneration state determination unit 105 carries out the processes in and after step S201 again.

The determination condition, the determination result, the countermeasure method, and the like by the regeneration state determination unit 105 are collectively shown in FIG. 8.

In a case of the inefficient regeneration (1), the determination condition is that the period of time during which the DOC outlet temperature is equal to or lower than the Target temperature−50° C. during the HC dosing is equal to or longer than 1 hour. There is no problem in a state of the engine 1. There is a possibility that the DOC 51 is deteriorated in a state of the DPF device 5. There is no problem in an operation state of a vehicle on which the engine 1 is mounted. The countermeasure method is to request the stationary manual regeneration. In a case in which the problem is not solved even when the stationary manual regeneration is carried out, troubleshooting related to the DPF device 5 is carried out. The troubleshooting may include, for example, measurement of DOC efficiency, DOC drying operation, or the like. It should be noted that the DOC efficiency can be obtained by a mathematical formula of (amount of heat converted by DOC/amount of heat of HC injected for regeneration)*100. In addition, the term "DOC drying operation" is an operation of removing unburned fuel adhering to the DOC inlet and soot with increase control of the temperature of the exhaust gas of the engine+no HC injection for regeneration.

In a case of the inefficient regeneration (2), the determination condition is that the number of times the regeneration is started over from the WarmUp state is equal to or higher than X times. There is no problem in the state of the engine 1 and the state of the DPF device 5. The operation state of the vehicle is a state in which the load fluctuation is large and the DOC inlet temperature is frequently lower than 250° C. The countermeasure method is to recommend the stationary manual regeneration or to issue a warning indicating that the operation state of the vehicle is a state in which the load fluctuation is large (for example, to issue a notification, such as making a suggestion to change the operation state of the vehicle to a state in which the load fluctuation is small).

In a case of the incomplete regeneration, the determination condition is that the period of time since the regeneration is requested is equal to or longer than 2 hours. The state of the engine is a state in which the defect occurs or a state in which the engine is left in a low idle state (idling state at a minimum number of revolutions at which the engine is not stopped). In a case in which the engine is left in the low idle state, as a result, the temperature does not reach the light-off temperature and the forced regeneration cannot be started in some cases. However, for example, the cause can be specified by checking an operating state (period of time during being left or the like) at the notification destination of the determination result by the regeneration state determination unit 105. There is no problem in the state of the DPF device 5 and the operation state of the vehicle. The countermeasure method is to request the stationary manual regeneration. In a case in which the problem is not solved by the stationary manual regeneration, the troubleshooting (variable geometry turbocharger (VGT) defect, air leakage, or the like) of the engine is carried out.

Hereinafter, a change in an HC dosing state in the inefficient regeneration (1), the inefficient regeneration (2), and the incomplete regeneration will be described with reference to FIG. 9. In FIG. 9, a horizontal axis represents time, and in order from the top, the HC dosing states (being carried out (being controlled) or being stopped) in cases of the inefficient regeneration (1), the inefficient regeneration (2), and the incomplete regeneration are shown. It should be noted that FIG. 9 shows a state in which the forced regeneration is requested at a point in time t21, 1 hour has elapsed from the point in time t21 at a point in time t22, and 2 hours have elapsed from the point in time t21 at a point in time t23.

In a case of the inefficient regeneration (1), the temperature of the exhaust gas is in a state of continuously reaching the light-off temperature, and the HC dosing is continuously carried out. In a case of the inefficient regeneration (2), the temperature of the exhaust gas is in a state of intermittently reaching the light-off temperature, and the HC dosing is intermittently carried out. In a case of the incomplete regeneration, the temperature of the exhaust gas is in a state in which the temperature does not continuously reach the light-off temperature, and the HC dosing is continuously stopped. It should be noted that, in this example, in a case of the incomplete regeneration, a state is achieved in which the temperature of the exhaust gas reaches the light-off temperature before a period of time T20 at the point in time t23 and the HC dosing is carried out before the period of time T20 at the point in time t23, but the regeneration completion condition is not satisfied before the point in time t23 is reached.

Hereinafter, the operation example of the regeneration state determination unit 105 in a case in which the forced regeneration is divided or interrupted will be described with reference to FIG. 10. The process shown in FIG. 10 is carried out in a case in which there is the regeneration request. When the process shown in FIG. 10 is started, the regeneration state determination unit 105 first acquires the estimated values of the DOC outlet temperature, the number of revolutions of the engine, and the soot deposition amount (step S301). Then, the regeneration state determination unit 105 determines whether or not a regeneration stop condition is reached (step S302). The regeneration stop condition is, for example, the engine stop (division) due to key-off, the regeneration prohibition (interruption) by the user, or the like.

In a case in which the regeneration stop condition is reached (in a case of "Y" in step S302), the regeneration state determination unit 105 repeatedly carries out the processes of step S301 and step S302 until the regeneration stop condition is eliminated.

On the other hand, in a case in which the regeneration stop condition is not reached (in a case of "N" in step S302), the regeneration state determination unit 105 issues an instruction to the forced regeneration control unit 103 to carry out the forced regeneration (step S303), and determines whether or not the regeneration completion condition is reached (step S304). In a case in which the regeneration completion condition is reached (in a case of "Y" in step S304), the regeneration state determination unit 105 terminates the forced regeneration (sets the presence of the regeneration request to the absence) (step S305), and terminates the process shown in FIG. 10. On the other hand, in a case in which the regeneration completion condition is not reached (in a case of "N" in step S304), the regeneration state determination unit 105 carries out the processes in and after step S301 again.

Actions/Effects

As described above, according to the present embodiment, the control device 100 for the DPF device 5 (exhaust gas post-treatment device) that includes the DPF 52 (filter) that collects the particulate substance in the exhaust gas of the engine 1 and the DOC 51 (oxidation catalyst) provided upstream of the DPF 52, and that regenerates the DPF 52 by the action of the DOC 51 is the control device 100 including the regeneration state determination unit 105 configured to, in a case in which the forced regeneration for forcibly increasing the temperature of the exhaust gas is carried out, when the number of times it is estimated that the temperature of the exhaust gas is lower than the light-off temperature for the period of time equal to or longer than the prescribed period of time exceeds the prescribed threshold (X times), issue the notification indicating that there is the problem in the operation state of the engine 1. With this configuration described above, it is possible to issue the notification indicating that there is the problem in the operation state or the like during the forced regeneration in progress.

It should be noted that, in a case in which it is determined that the forced regeneration is not completed even after the period of time during which it is estimated that the temperature of the exhaust gas is equal to or higher than the light-off temperature has elapsed for the period of time equal to or longer than the period of first determination time (1 hour), the regeneration state determination unit 105 can further issue the notification indicating that there is a possibility of the defect of the DOC 51 (oxidation catalyst).

In addition, in a case in which it is determined the forced regeneration is not completed even after the period of time since the forced regeneration is started has elapsed for the period of time equal to or longer than the period of second determination time (2 hours) longer than the period of first determination time, the regeneration state determination unit 105 can further issue the notification that there is a possibility of the defect of the engine.

Hereinbefore, the embodiment of the present invention is described with reference to the drawings, but the specific configuration is not limited to the embodiment described above, and includes design changes and the like without departing from the gist of the present invention. For example, in the embodiment described above, the exhaust gas post-treatment device is configured by using the DPF device 5. However, for example, a selective catalytic reduction (SCR) device may further be provided on the downstream side, or for example, the SCR device may be provided on the downstream side and the DPF 52 may be omitted from the DPF device 5. In addition, a part or all of a program executed by the control device 100 can be distributed via a computer-readable recording medium or a communication line.

INDUSTRIAL APPLICABILITY

According to the embodiment described above, it is possible to issue the notification indicating that there is the problem in the operation state or the like during the forced regeneration in progress.

REFERENCE SIGNS LIST

1: Engine
3: Exhaust pipe
5: DPF device
7: HC doser
51: DOC
52: DPF
94: DOC inlet temperature sensor
95: DOC outlet temperature sensor
96, 97: Pressure sensor
100: Control device
105: Regeneration state determination unit

What is claimed is:

1. A control device for an exhaust gas post-treatment device that includes a filter that collects a particulate substance in exhaust gas of an engine and an oxidation catalyst provided upstream of the filter, and that is configured to regenerate the filter by an action of the oxidation catalyst, the control device comprising:
   a regeneration state determination unit configured to, in a case in which forced regeneration for forcibly increasing a temperature of the exhaust gas is carried out, when the number of times it is estimated that the temperature of the exhaust gas is lower than a light-off temperature for a period of time equal to or longer than a prescribed period of time exceeds a prescribed threshold, issue a notification indicating that there is a problem in an operation state of the engine.

2. The control device according to claim 1,
   wherein the regeneration state determination unit is configured to, in a case in which it is determined that the forced regeneration is not completed even after a period of time during which it is estimated that the temperature of the exhaust gas is equal to or higher than the light-off temperature has elapsed for a period of time equal to or longer than a period of first determination time, further issue a notification indicating that there is a possibility of a defect of the oxidation catalyst.

3. The control device according to claim 2,
   wherein the regeneration state determination unit is configured to, in a case in which it is determined the forced regeneration is not completed even after a period of time since the forced regeneration is started has elapsed for a period of time equal to or longer than a period of second determination time longer than the period of first determination time, further issue a notification that there is a possibility of a defect of the engine.

4. A notification method for an exhaust gas post-treatment device that includes a filter that collects a particulate substance in exhaust gas of an engine and an oxidation catalyst provided upstream of the filter, and that is configured to regenerate the filter by an action of the oxidation catalyst, the notification method comprising:
   a step of, in a case in which forced regeneration for forcibly increasing a temperature of the exhaust gas is carried out, when the number of times it is estimated that the temperature of the exhaust gas is lower than a light-off temperature for a period of time equal to or longer than a prescribed period of time exceeds a prescribed threshold, issuing a notification indicating that there is a problem in an operation state of the engine.

* * * * *